Feb. 19, 1935.  J. BIJUR  1,991,370
LIQUID FLOW DIVISION
Filed Oct. 18, 1928    2 Sheets-Sheet 2
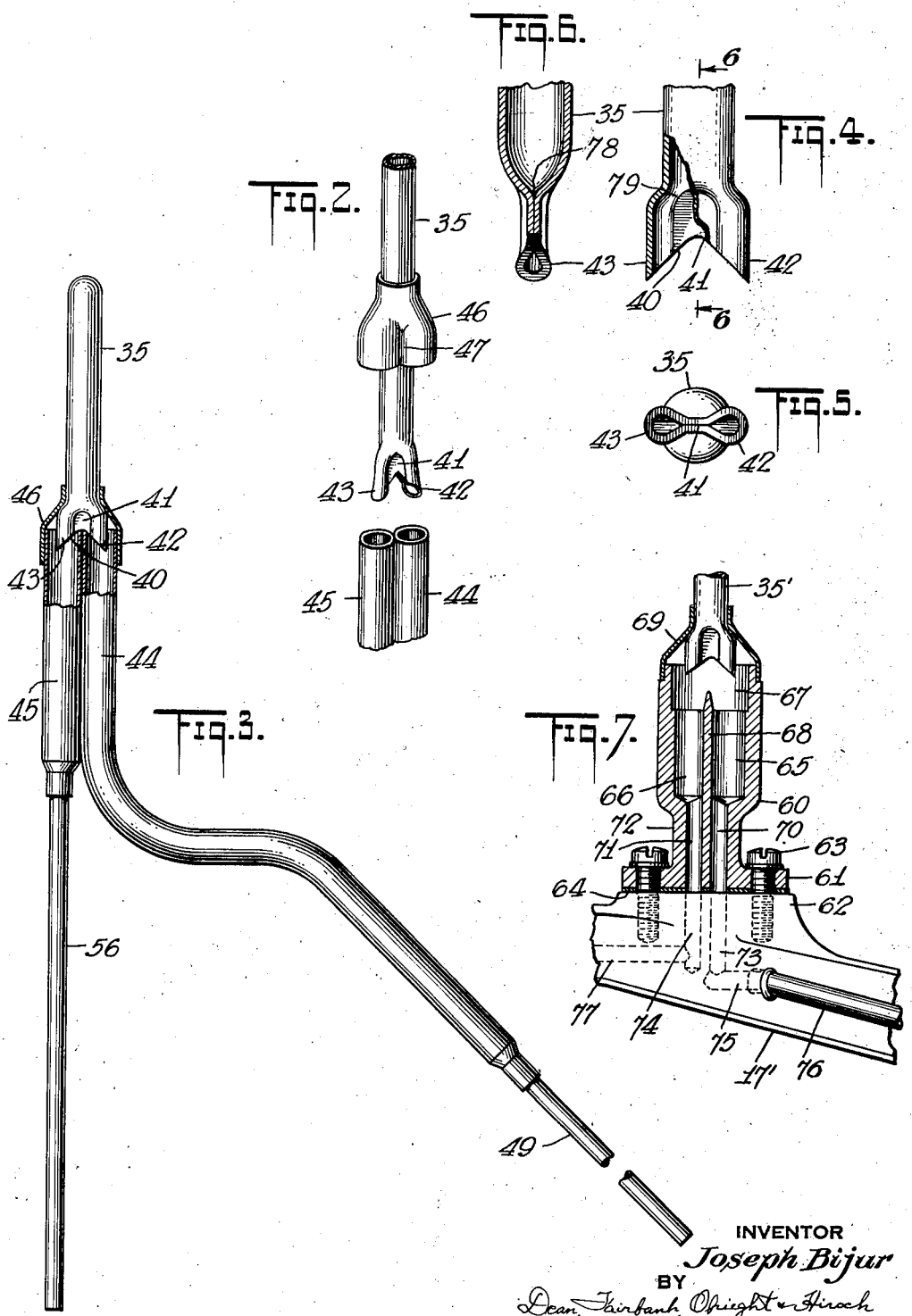
INVENTOR
Joseph Bijur
BY
Dean, Fairbank, Obright & Hirsch
his ATTORNEYS.

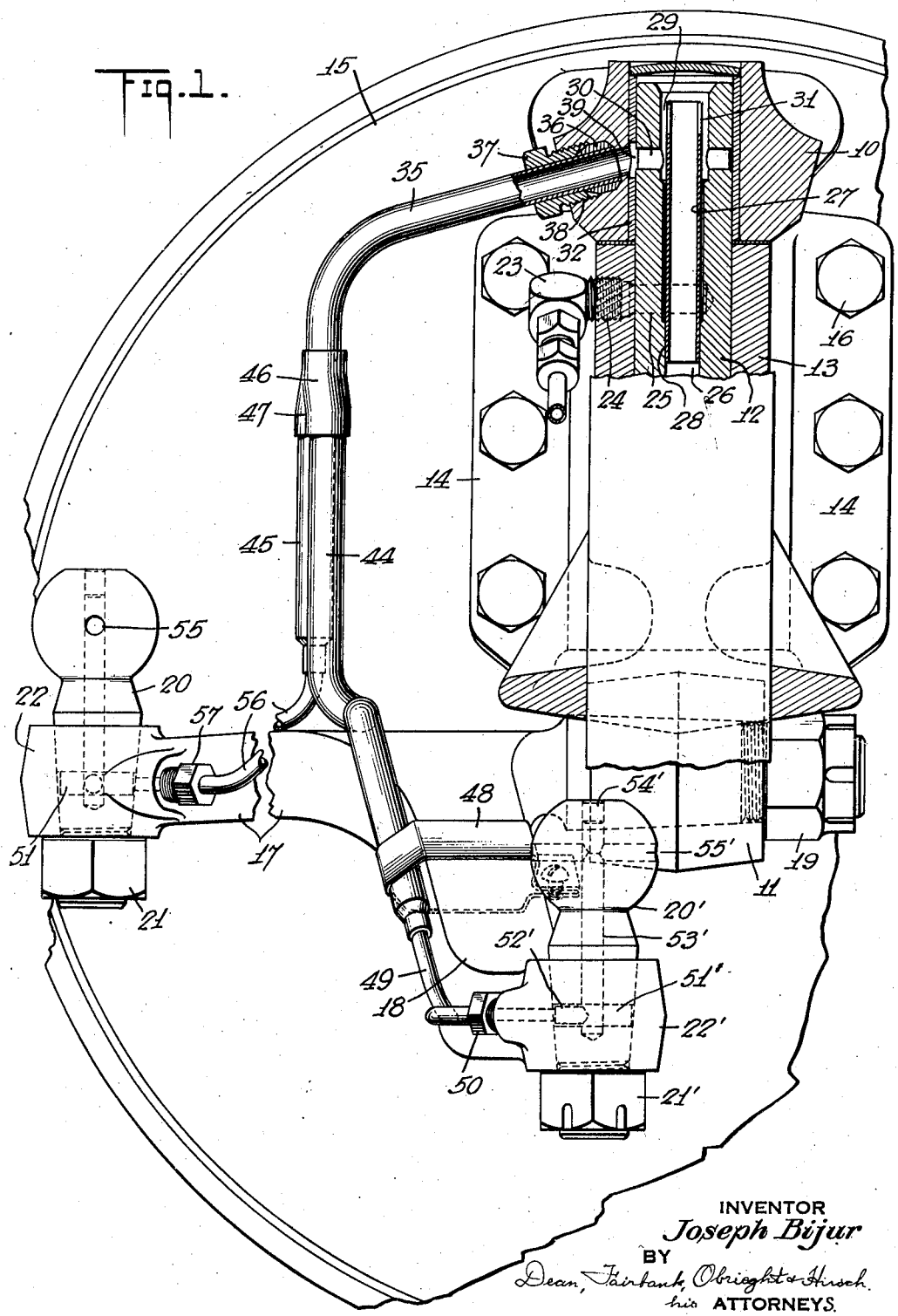

Patented Feb. 19, 1935

1,991,370

UNITED STATES PATENT OFFICE 1,991,370

LIQUID FLOW DIVISION

Joseph Bijur, New York, N. Y., assignor to Auto Research Corporation, a corporation of Delaware Application October 18, 1928, Serial No. 313,262

38 Claims. (Cl. 184—7)

My present invention is primarily concerned with the distribution, by gravity flow, of liquid fed slowly as for example only a drop or two at a time, for substantially concurrent delivery to two or more places.

Among the objects of the present invention are to avoid leak at the swivel mount of a knuckle or analogous part, in supplying the same from a pressure distributing system, without introducing any loose or flapping conduits to bridge across the swivel, and yet to assure the prompt and reliable, division and delivery of the respective small quotas of lubricant, free from foreign matter, to the various bearings carried by the knuckle.

Among more specific objects are to provide a construction for the above purpose, the elements of which are of small cost and may be located in substantially concealed position, shielded from impact in normal use of the vehicle.

Another object is to provide a preassembled unit for distributing lubricant to the bearings on a knuckle, and which may be easily installed on the knuckle, and which necessitates the exercise of no considerable care in the positioning of the parts to assure reliable flow division and feed.

According to the present invention, the flow division is effected by conforming the feed pipe extremity to afford as many contiguous restricted openings as there are bearings to be lubricated. The drip from the openings is intercepted in as many compartments or pipes as there are bearings, each pipe or conduit leading to the corresponding bearing. Preferably a hood or collar is provided about the lower extremity of the feed pipe and the upper extremity of the distributing piping or conduits, which serves to maintain the parts from relative displacement, to exclude dust and dirt, and yet to afford a cavity sufficiently large, from the feed pipe openings to the delivery conduit inlets, to permit unimpeded drip as freely as in open air. Preferably the upstanding pipes are formed in a unitary assembly with tail pipe ends, and are preassembled with the feed pipe, so that the preassembled harness of pipe may be conveniently installed on the knuckle.

Each opening preferably constitutes or is the inlet to a corresponding nozzle, the surface between the nozzles being so conformed, that oil from different nozzles will not creep therealong and coalesce.

According to a preferred feature, the lower feed-pipe extremity is flattened and preferably notched to form a fish-tail end, providing pointed nozzles, from which the drip occurs. The effective cross-section of the pipe bore is reduced to such extent at the flattened outlet end, that even though but a drop or two be fed, this supply will lodge across the restricted openings to the nozzles and will thus be divided equally or otherwise between the nozzles in a predetermined manner, and such accurate predetermined division will occur even though the feed pipe end be inclined materially to the vertical. The inlet to the distributing pipes from the nozzles may be embodied in a pair of closely associated upstanding pipes, affording entrance to the distributing piping and to the opposite sides of which the respective nozzles drip. The feed pipes or conduits are preferably made of sufficient diameter to prevent stanching of flow.

In the accompanying drawings in which are shown one or more of various possible embodiments of the several features of my invention:—

Fig. 1 is a side elevation of a steering knuckle, embodying my invention, with certain parts thereof, shown in section, and others broken away.

Fig. 2 is an exploded perspective of the pipe assembly,

Fig. 3 is a perspective view showing the completed pipe assembly partly in section, Fig. 4 is a side elevation on a larger scale, of the dividing end of the feed pipe, parts being shown broken away, Fig. 5 is an end elevation of the dividing end of the feed pipe, Fig. 6 is a sectional detail on line 6—6 of Fig. 4, and Fig. 7 is a fragmentary view in longitudinal section, showing a modified form of flow distributor.

In Fig. 1 is shown the general layout of one form of steering knuckle, with a bifurcated mount or clevis, including a bearing 10 about the upper end, and a bearing 11 about the lower end of the king pin 12, which is pinned into the axle eye 13. The knuckle includes the usual flange 14 to which the brake shield 15 is bolted at 16. The tie rod arm 17 and drag link arm 18 are preferably embodied in a unitary L-shaped forging bolted at 19 to the lower end of the main knuckle structure. The tie rod arm is provided with an upstanding ball stud 20 clamped by nut 21 into tapered eye 22, and the drag link arm 18 is provided with a similar ball stud 20', similarly clamped by nut 21' into tapered eye 22'.

Lubricant for the various bearings of the knuckle is admitted preferably through a drip plug 23, illustratively threaded at 24 into the axle eye 13. The king pin is formed with a transverse bore 25 delivering the lubricant from the drip plug to the narrow annular space between a longitudinal bore 26 through the king pin and a tube 27 affording small clearance above its tightly fitted lower end 28.

The king pin bore is widened at its upper end at 29 to form a lubricant trough or receiver and said widened portion communicates with a bore 30 transversely of the king pin. The upper end of the tube 27 is slotted at 31 to allow overflow of lubricant from the annular space, inward through tube 27 and the king pin bore 26 to the lower king pin bearing, while oil from the transverse bore 30 lubricates the bushing 32 of the upper king pin bearing. The various features of the lubricating construction are more fully described and claimed in my copending applications, Serial No. 58,704, filed September 26, 1925 which has now matured into Patent No. 1,862,513, dated June 7, 1932, and Serial No. 202,997, filed July 2, 1927 which has now matured into Patent No. 1,755,628, of which the present application is a continuation in part.

According to the present invention, a feed pipe 35 is connected at its upper end by a compression coupling sleeve 36, tightened by a threaded bushing 37 into a socket 38 in the upper knuckle bearing. Bore 30 communicates with said pipe 35 through a port 39 in bushing 32. The lower end of pipe 35 has an obstruction, preferably of rigid material, determining a narrowed trough across the end of the pipe, with a plurality of contiguous restricted outlets across which the lubricant will first spread, though but a few drops have been admitted to pipe 35. The lubricant thereupon flowing through the outlets is equally divided between them. In a preferred specific embodiment, the lower extremity of the feed pipe 35 is notched at 40 and flattened or pressed together to provide a fish-tail terminal. Preferably the pinch or pressing together is effected with a die affording a U-shaped impression as at 41, which presses the pipe wall close together, and thus forms an obstruction across the pipe end. The inner end of the obstruction determines a wedge-shaped trough 78 as shown in Fig. 6, sloping downward at its ends to deliver to restriction outlets 79 which, in turn, communicates preferably with diverging nozzles 42 and 43, laterally of obstruction 41 and terminating at the ends of the V-shaped notch 40. The wedge-shaped trough 78 determined by the inner end of flattened obstruction area 41, causes the lubricant to spread thereacross to the restriction openings 79 which latter dam the exit to such extent, that substantially equal division occurs, of a charge, however small, though but a few drops. It is apparent that the drip from each nozzle will tend to separate at the very base of the V-notch, and there is no likelihood of the oil from any nozzle, traveling along the notch and coalescing with oil from a companion nozzle. The separation between the nozzle outlets is, moreover, so great that the drip through separate paths is assured. While for theoretically perfect action, the lower end of pipe 35 should be vertical, my construction gives satisfactory division though said pipe end be inclined at a substantial angle.

The feed pipe 35 communicates with upstanding distributing conduits or pipes 44 and 45, which are preferably brazed or soldered together. Pipe 44 delivers the discharge of nozzle 42 to the drag link bearing 20' and pipe 45 delivers the discharge of nozzle 43 to the tie rod bearing 20. For this purpose, the nozzle ends of the feed pipe are disposed, nozzle 42 directly above the upper extremity of pipe 44 and nozzle 43 directly above the upper extremity of the other pipe 45, as shown. A hood or collar 46 serves to maintain said nozzles and said feed pipes in assembled relation. This hood, as shown, is preferably brazed or soldered at its neck about the lower end of the feed pipe 35 and is similarly connected at its widened end to the upper extremities of the distributing pipes, the collar being longitudinally indented at 47 for snug engagement with said pipes. The partition area 41 of pipe 35 separating the two nozzles 42 and 43 extends at right angles, as shown, relative to the tangent plane of the pipes 44 and 45, so that no great care need be exercised in aligning said parts to assure registry of the respective nozzles each with its associated delivery pipe. The apex of notch 40, moreover, assists in aligning said parts, and is preferably brought into engagement with the ends of distributing pipes 44 and 45, as shown, in which position, it is maintained by hood 46.

The pipe 44 extends downward, and along the drag link arm, is lashed thereto by means of a clip 48, and delivers into a tail-pipe 49 which, in turn, is secured by a bushing 50 into eye 22' of the drag link arm 18. Stud 20', as shown, is formed at its taper fitted portion with a peripheral groove 51' communicating with a radial bore 52' in turn, feeding into a longitudinal bore 53' plugged at its upper end 54' and emitting through radial bores 55' to the bearing surface of the ball end. The pipe 44 feeds to a tail pipe 56 similarly connected by bushing 57 to the tie rod bearing, the oil passages of which similarly identified are identical with those on the drag link arm.

As shown, the pipe 35 is of relatively large diameter,—of bore ¼ inch or more and each of the pipes 44 and 45 also is of such larger diameter, down to a level below that of the corresponding ball stud outlet. Thus, stanching or air blocking are avoided, the oil flowing readily about any air in the feed pipe and the large diameter of the distributing pipes 44 and 45 will at no time become filled by the small volumes of oil fed thereto from the drip plug. Thus, siphoning from a higher to a lower bearing is precluded.

The principle of operation on which the non-air blocking and non-siphoning action depends, is fully set forth in my copending application, Serial No. 202,997, filed July 2, 1927, in which the construction accomplishing this result is more broadly claimed.

Tail pipes 49 and 56 may be of small diameter, since they are below the ball stud outlets, and thus determine a trap in which oil is always present. The small-diameter tail pipes afford the advantage of dispensing with the need for large bores in the eyes 22, 22' for adequate terminal connections. The collar or hood 46 serves not only to maintain the accurate positioning of the feed and distributing pipes relative to each other and to exclude dust or dirt from the path of drip, but also determined a substantial air chamber therein, to prevent resistance or stanching or intermingling of the drip from the respective nozzles, each nozzle dripping into its pipe as if in free air.

In operation, lubricant passed through the drip plug 23 will cause overflow from the annular space about tube 27 and will effect lubrication of the king pin bearings, as previously described. Lubricant overflowing from cavity 29 through bore 30 into feed pipe 35 will be divided by the nozzles 42 and 43 at the fish tail end, the discharge of which will be intercepted respectively by the large pipes 44 and 45 and will flow therethrough to deposit upon the respective traps at tail pipes 49 and 56, thereby causing overflow through the respective outlets 55 and 55', to the corresponding tie rod and drag link ball stud bearings 20 and 20' respectively.

Preferably, the entire harness of ball stud feeding piping is preassembled as a separate article of manufacture, shown in Fig. 3 and then installed upon the knuckle; the upper inlet end of the feed pipe being connected to the upper knuckle clevis by sleeve 36 and bushing 37, the pipe 44 being lashed to the drag link arm at 48 and the tail pipe extremities 49 and 56 being bent to extend along the respective knuckle arms, and their outlet ends being positioned by the bushings 50 and 57 respectively.

By the present arrangement, it will be seen that the entire pipe harness feeding the knuckle bearings, extends to the rear of the king pin, where it is not only protected from impact in use, but is inconspicuous.

The specific arrangement for feeding the knuckle through the king pin is largely illustrative of one of various possible arrangements for supplying lubricant to my oil dividing installation, and the latter may be supplied directly from a front wheel brake construction shown for instance, in my British patent, No. 235,687 of April 30, 1924, or by any other appropriate arrangement.

The principle of the dividing construction shown, may be carried forward by providing three or more nozzles at the feed pipe extremity to feed a corresponding number of bearings in parallel.

While the invention finds its preferred application for knuckle lubrication, and particularly where the lubricant is derived from a pressure lubricating distributing system, for instance of the drip plug type, it will be understood that in its broader aspects, the invention is applicable more generally to feeding lubricant or other liquid by gravity, especially where the supply is not by volume flow, but by slow dripping feed. Thus, a plurality of parts may be supplied by tail pipes leading from a cluster of corresponding outlets or nozzles supplied by gravity from a tank.

In Fig. 6 is shown a modification in which the drip from the feed pipe nozzles is intercepted at a receptacle casing 60, which has a support flange 61 resting on a corresponding lug 62 on the arm 17' to which it is attached by screws 63, an interposed gasket 64 affording a lubricant-tight connection. Vertical bores 65 and 66 communicate with the circular mouth 67 of the receptacle and are separated by a central vertical partition 68. The fishtail terminal of the feed pipe 35' straddles the upper edge of the partition 68, and a collar 69 similar to that at 46 in Figs. 1 to 3, serves to connect the lower end of the feed pipe with the receptacle mouth 67, in order to maintain the relative positioning of the parts, to exclude dirt and to determine an air chamber as in the other embodiment. Bores 65 and 66 communicate respectively with smaller bores 70 and 71 vertically through the support stem 72 of the receptacle, and, in turn, communicating with bores 73 and 74 in the knuckle arm. Bore 73 communicates with a short horizontal bore 75 to which is connected the inlet end of pipe 76, which leads to the drag link bearing (not shown) while bore 74 delivers into bore 77 leading to the tie rod bearing (not shown).

Although the measuring liquid arrangements shown and claimed in the present application have been specifically applied to the division of lubricant upon the knuckle structure of an automobile, it is obvious that they may be utilized for division of lubricant of the chassis bearings and between bearings other than those associated with automobiles. The dividing arrangement may also be utilized for the division of other liquids than lubricants.

I claim:—

1. In a liquid distributing system, a feed device comprising a flattened pipe end, the middle portion of which flattened end is closed whereby it delivers in parallel through a cluster of contiguous restriction outlets, and drain conduits leading from the respective restriction outlets.

2. In a liquid distributing system, a feed device having a transverse trough conformation at its bottom with a cluster of depending tit-like open passageways of small diameter, and means draining the emission from the respective outlets through separate courses.

3. In a liquid distributing system, a gravity feed device having a transverse trough-shaped bottom, with contiguous restricted draining openings, and nozzles leading from the respective restricted openings and spaced more widely apart at the nozzle outlets.

4. In a gravity distributing system of the character described, a multiple nozzle construction comprising a feed pipe having an obstruction across its outlet end, determining a transverse trough structure, and restricted outlets at the ends of the trough structure, said outlets delivering into diverging short nozzles.

5. In a gravity distributing system, the combination of a feed pipe having an obstruction at its outlet end, determining downwardly sloping troughs transversely of the pipe bore, restricted openings at the lower ends of the respective troughs and nozzles integral with the pipe and supplied from said openings.

6. In a gravity distributing system, a feed pipe having its wall pressed together at one end to constitute a trough-shaped transverse obstruction with downwardly inclined ends, restricted outlets from the pipe at the ends of said obstruction, the pipe wall laterally of said obstruction constituting outlet nozzles.

7. In a distributing system of the character described, the combination of a pipe portions of the walls of which are collapsed to subdivide the bore thereof near its extremity into a plurality of nozzles, and means below said pipe intercepting the segregated discharge from the respective nozzles.

8. In a liquid distributer of the character described, the combination of a feed pipe having a plurality of short nozzles at the outlet end thereof, said feed pipe being substantially closed at its lower end between said nozzles, said nozzles extending below said feed pipe closure.

9. In a distributing system of the character described, the combination of a pipe having a damming obstruction of rigid material constituting a fixed part near the pipe extremity and subdividing the outlet into a plurality of nozzles, the pipe end between said nozzles extending above the outlets from the latter.

10. In a distributing system of the character described, the combination of a pipe having a damming obstruction constituting an integral part of the pipe near the extremity thereof and sub-dividing the outlet into a plurality of nozzles, the pipe end between said nozzles extending above the outlets from the latter.

11. In a liquid distributer of the character described, the combination of a feed pipe having a plurality of short nozzles at the outlet end thereof, said feed pipe being substantially closed at its lower end between said nozzles, said nozzles extending below said feed pipe closure, distributing conduits in flow intercepting relation with the respective nozzles, and a protective collar encircling the lower end of said feed pipe and the upper ends of said distributing piping and secured thereto in dirt-excluding relation.

12. In a liquid distributer of the character described, the combination of a feed conduit having a plurality of outlet nozzles, distributing conduits in flow intercepting relation with the respective nozzles, and a protective collar encircling the feed conduit near its nozzle end, encircling the distributing conduits and enclosing the nozzles.

13. In a lubricating system, the combination of a gravity flow pipe having a drooping outlet, constricted to afford spaced nozzles, and conduits having their inlets below said nozzles and intercepting the drip therefrom, said conduits delivering to the respective bearings to be lubricated.

14. In a lubricating system for a plurality of bearings, the combination of a pipe obstructed at its lower extremity to afford a plurality of outlet nozzles, lubricant intercepters directly under the respective nozzles, and means draining said intercepters to the respective bearings.

15. In a lubricating system for a plurality of bearings, the combination of a pipe obstructed at its lower extremity to afford a plurality of outlet nozzles, lubricant intercepters directly under the respective nozzles, means draining said intercepters to the respective bearings, and a closure effecting a substantially dust-tight connection between the receptacle and the pipe and enclosing a substantially hollow space through which the nozzles drip to the respective compartments.

16. In a lubricating system for a plurality of bearings, the combination of a gravity flow pipe, centrally constricted at its extremity to afford a pair of nozzles at the pipe end, conduits having their inlets below said nozzles and intercepting the drip therefrom, said conduits leading to the respective bearings to be lubricated, and a hood enclosing said nozzles, encircling the contiguous ends of said pipe and of said conduits, said hood enclosing an air chamber of substantial volume.

17. In a lubricating installation, a gravity feed pipe having a drooping lower end, the extremity of said pipe being medianly flattened together, to afford lateral nozzles, and a pair of conduits extending under the respective nozzles to intercept the drip therefrom.

18. In a lubricating installation, a gravity feed pipe having a drooping lower end, the extremity of said pipe being medianly flattened together, to afford lateral nozzles, a pair of conduits extending under the respective nozzles to intercept drip therefrom, and a dust-excluding hood encircling said pipe and the inlet ends of said conduits, and determining a chamber of volume sufficient for substantially unimpeded drip from the nozzles to the respective conduits.

19. The combustion of a feed pipe having a downwardly drooping end, flattened together for less than its width and notched at its extremity in the form of a fish-tail affording nozzles, and a hood piece encircling said pipe extremity, rigidly secured thereto, extending beyond the nozzles and adapted to be telescoped with respect to a drip intercepting construction.

20. The combination of a feed pipe having a drooping end, flattened together for less than its width, and notched at its extremity in the form of a fish-tail affording lateral nozzles for passage of the lubricant therefrom, a hood piece encircling said pipe extremity, rigidly secured thereto, and extending beyond the nozzles, and a drip intercepter having its upper end telescoped into said hood and secured thereto and affording segregated paths for the drip from the respective nozzles.

21. As an article of manufacture, a preassembled flow distributing pipe harness for application to the steering knuckle of a chassis lubricating system and including a pipe length having a pair of nozzles at its lower end and closed between said nozzles, said nozzles extending below said closure, a collar encircling the lower end of said pipe and firmly fastened thereto and having a rim extending downward beyond said nozzles and means affording separate inlets in drip intercepting relation with the respective nozzles and telescoped with respect to said collar.

22. As an article of manufacture, a preassembled flow distributing pipe harness for application to the steering knuckle of a chassis lubricating system and including a pipe length having a pair of nozzles at its lower end and closed between said nozzles, said nozzles extending below said closure, a collar encircling the lower end of said pipe and firmly fastened thereto and having a rim extending downward beyond said nozzles, and a pair of pipe lengths directly below the respective nozzles and parallel at their inlet lengths and having pipe lengths of reduced diameter for application at the respective knuckle bearings, the main length of distributing piping of larger diameter extending in the installed harness below the corresponding outlets to the bearings to be lubricated.

23. As an article of manufacture, a preassembled flow distributing pipe harness for application to the steering knuckle of a chassis lubricating system, and including a pipe length of relatively large diameter having its lower extremity medianly pressed together to determine lateral nozzles, a collar encircling the lower end of said pipe and fastened thereto and having a rim extending downward beyond said nozzles, and means affording separate inlets in drip-intercepting relation with the respective nozzles and secured to said collar, said means having distinct tail pipe lengths leading therefrom, adapted to be bent with respect to the knuckle construction for delivery to the respective bearings thereof.

24. In a liquid distributer of the character described, the combination of a feed pipe having an obstruction longitudinally thereof of width greater than its thickness and determining nozzles laterally thereof, and a twin flow intercepting construction below said nozzles having a dividing wall extending substantially at right angles to the feed pipe obstruction.

25. In a liquid distributer of the character described, the combination of a feed pipe having an obstruction longitudinally thereof of width greater than its thickness and determining nozzles laterally thereof, and flow intercepting pipes extending below the respective nozzles and in longitudinal engagement, the tangent plane between said pipes being at right angles to and bisecting the plane of said obstruction.

26. A liquid distributer comprising a feed pipe centrally flattened at its outlet end and determining a pair of lateral nozzles, said extremity having also a symmetrical V-notch, and flow intercepters extending below the respective nozzles and having a dividing wall in contact with the apex of the notch.

27. A liquid distributer comprising a feed pipe centrally flattened at its outlet end and determining a pair of lateral nozzles, said extremity having also a symmetrical V-notch, flow intercepters extending below the respective nozzles and having a dividing wall in contact with the apex of the notch and a protective collar encircling the feed pipe and the distributing pipes.

28. In a steering knuckle having a pair of arms and bearings at such arms; the combination of distributing pipes leading to the respective bearings and extending along the respective arms, said pipes having upstanding inlet ends, means for feeding lubricant into said inlets, said means comprising a feed pipe having an inlet at its upper end, and having a drooping outlet end, substantially directly above said upstanding pipe ends, the extremity of said feed pipe having a partition to afford a pair of lateral nozzles respectively aligned with the two inlets and a hood piece closing the gap between the feed pipe nozzles and the distributing pipe inlets, and affording a free drip gap therebetween.

29. In a steering knuckle, having a pair of arms, the combination of a receptacle secured to one of said arms and having an upstanding dividing wall therein, outlets from said receptacle leading lengthwise of the respective arms to the bearings thereof, and means for feeding lubricant to opposite sides of said dividing wall, said means comprising a pipe having an outlet above said receptacle, said pipe extending downward and having a partition at its lower extremity to afford a pair of lateral nozzles, extending directly above the compartments at opposite sides of the partition and a hood piece encircling said pipe and secured thereto and having a rim encircling said receptacle and secured thereto, and affording a sufficient volume of air for free drip.

30. A lubricating installation for a motor vehicle having a knuckle with associated bearings, and a pivot mount for said knuckle, said installation comprising a lubricant distributing arrangement on the knuckle feeding associated bearing or bearings and means for feeding lubricant to said arrangement, said means including a lubricant inlet delivering into the pivot mount, a stand pipe in a corresponding bore through said mount determining an annular passage extending upward to the top of the pivot mount, and a transverse opening in said pivot mount delivering from said annular passage to said arrangement.

31. A lubricating installation for a motor vehicle having a clevised knuckle with associated bearings, and a pivot mount for said knuckle, said installation comprising a lubricant distributing arrangement on the knuckle connected to the upper clevis thereof and feeding associated bearing or bearings, means for feeding lubricant to said arrangement, said means including a lubricant inlet delivering into the pivot mount, a stand pipe in a corresponding bore through said pivot mount, determining an annular passage extending upward to the top of the pivot mount, and a transverse passage through said pivot mount delivering from said annular passage to said arrangement, the upper end of said stand pipe being notched for inward flow of lubricant, said pivot mount bore delivering the inward flow to a pivot mount bearing.

32. In combination with a steering knuckle having a tie rod bearing and a steering arm having a drag link bearing; a lubricating installation comprising a lubricant feeding passage carried by said knuckle initiating near the upper end thereof, a dividing fitting having a plurality of outlets secured to said knuckle and supplied from said passage, a pipe from one outlet of said dividing fitting secured to said knuckle extending generally downward to supply the tie rod bearing and a pipe connected to the other outlet of the fitting and extending along the structure of the knuckle and along the length of the steering arm to the bearing thereof, said dividing fitting having a plurality of flow proportioning restricted passageways and including a chamber of diameter sufficiently large to allow passage of lubricant around any air therein, whereby the entry of lubricant to said pipes will not become blocked.

33. In combination with a steering knuckle having a tie rod bearing and a steering arm having a drag link bearing; a lubricating installation comprising a lubricant feeding passage carried by said knuckle initiating near the upper end thereof, a dividing fitting having a plurality of flow proportioning restricted passageways secured to said knuckle and supplied from said passage, a pipe from one outlet of said dividing fitting secured to said knuckle extending generally downward to supply the said tie rod bearing and a pipe connected to the other outlet of the fitting and extending along the structure of the knuckle and along the length of the steering arm to the bearing thereof, the restricted passageways in said fitting being of insufficient width to permit reverse flow of lubricant and air.

34. In a motor vehicle of the type including an axle, a knuckle having a pivot mount thereon with upper and lower bearings and other bearings positioned adjacent to said pivotal mount; the combination therewith of a lubricant installation for the lower pivotal bearing and at least one of the adjacent bearings comprising a lubricant inlet, a distributing receiver above said lower pivotal bearing receiving lubricant from said inlet, an interior conduit system adjacent said pivotal mount supplying said lower pivotal bearing, an exterior conduit system for supplying at least two of said adjacent bearings and a dividing means having a plurality of flow proportioning restricted passageways upon said exterior conduit system to determine the proportion of lubricant supplied to said adjacent bearings.

35. The combination of a king pin rigid therewith, a steering knuckle having a pivotal mount including upper and lower bearings upon said king pin, a lubricant inlet at a part of said knuckle mount, longitudinal and transverse ducts through the king pin connecting the inlet and the bearings, and a standpipe in said longitudinal duct in the upper end of said king pin determining the division of lubricant between said bearings, said standpipe forming an annular chamber in the upper part of said longitudinal bore, said inlet feeding the lower part of said annular chamber, and the overflow into the standpipe being supplied to the lower king pin bearing, said transverse duct extending radially through the upper part of the king pin from the annular chamber to the upper bearing.

36. The combination of a steering knuckle, a king pin serving as a pivotal mount for the knuckle, said knuckle being provided with upper and lower bearing mounts on said king pin, an inlet for lubricant to feed said bearing mounts, and means associated with said king pin assuring proper division of the lubricant to the said upper and lower bearing mounts including an axial bore through the king pin, the upper part of which bore is enlarged, a standpipe in the upper part of said bore forming an annular compartment with said bore, said inlet feeding into the lower part of said annular compartment, said standpipe being provided with slots in the upper portion thereof to control the overflow thereinto, which overflow feeds said lower bearing mount.

37. The combination of a steering knuckle, a king pin serving as a pivotal mount for the knuckle with upper and lower bearing surfaces receiving said knuckle, an inlet and means assuring proper division of the lubricant to the said upper and lower bearing surfaces, said means including a longitudinal bore through the king pin having a plurality of successive enlargements toward the upper end of the king pin, a standpipe fitting in the upper part of the bore forming an annular chamber at said enlargements, said inlet feeding the lower part of said annular chamber and transverse passageways through said king pin and said standpipe adjacent the upper end of said annular chamber to receive and feed lubricant respectively to the upper and lower bearings.

38. Knuckle lubrication means including in combination with a steering knuckle assemblage of the type which includes upper and lower king pin bearings and subsidiary outlying steering arm and tie rod bearings, means to feed oil into a trough at the top of the king pin, an outlet passage through the knuckle clevis delivering oil from said trough, a distributing piping system on the outside of the knuckle fed from said passage with a proportioning fitting delivering lubricant to the outlying bearings and an axial bore in the king pin receiving overflow from said trough and delivering it to said lower king pin bearing, said upper king pin bearing being fed directly from said trough.

JOSEPH BIJUR.